July 9, 1968   L. W. LESSLER   3,391,979
CABINETED MOTION PICTURE PROJECTOR
Filed Sept. 23, 1965   3 Sheets-Sheet 1

INVENTOR.
LEW W. LESSLER
BY
ATTORNEY

July 9, 1968  L. W. LESSLER  3,391,979
CABINETED MOTION PICTURE PROJECTOR
Filed Sept. 23, 1965  3 Sheets-Sheet 2

INVENTOR.
LEW W. LESSLER

ATTORNEY

July 9, 1968     L. W. LESSLER     3,391,979
CABINETED MOTION PICTURE PROJECTOR
Filed Sept. 23, 1965     3 Sheets-Sheet 3
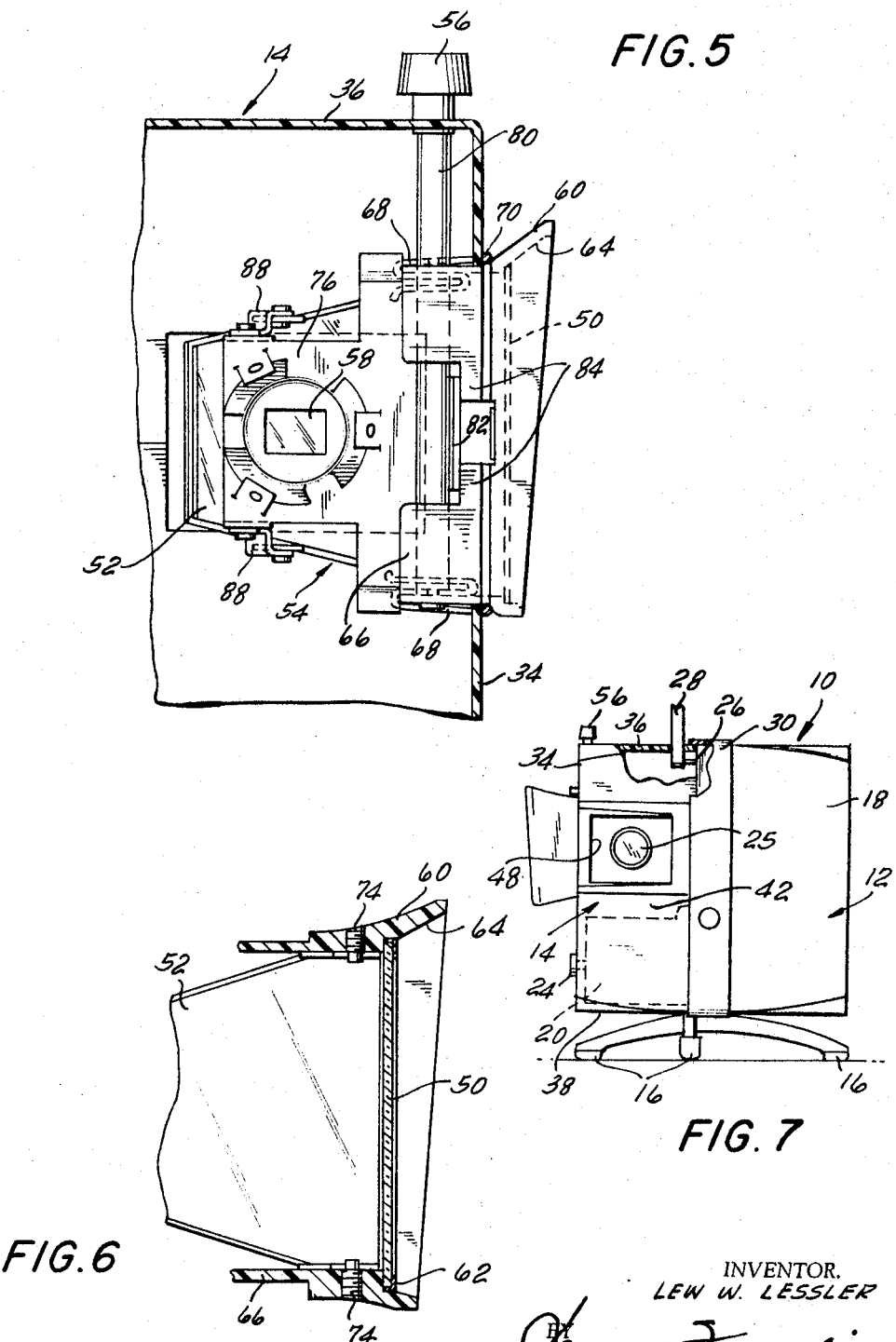
INVENTOR.
LEW W. LESSLER
ATTORNEY

United States Patent Office 3,391,979
Patented July 9, 1968

3,391,979
CABINETED MOTION PICTURE PROJECTOR
Lew W. Lessler, Elmhurst, N.Y., assignor to De Jur-Amsco Corporation, Long Island City, N.Y., a corporation of New York
Filed Sept. 23, 1965, Ser. No. 489,597
6 Claims. (Cl. 352—242)

ABSTRACT OF THE DISCLOSURE

A cabineted motion picture projector comprising a rear cabinet section housing and supporting the parts of the motion picture projector and a front cover section removably attachable to the rear cabinet section. The front cover section has a built-in screen and also an enlarging lens and a reflector. The lens and reflector are selectively movable between a first position in the projection path for diverting the picture to the built-in screen and a second folded position for projection on a remote screen.

---

This invention relates to a motion picture machine, and more particularly to a cabineted motion picture projector.

The prime object of my present invention is the provision of a cabineted motion picture projector designed for both open cabinet and closed cabinet motion picture projection, so constructed that with the cabinet closed, the projector is adapted for projection either onto a remotely positioned screen or onto a cabinet built-in screen.

A more specific object of the invention is the provision of a cabineted motion picture projector comprising a cabinet having a rear cabinet section forming a housing and support for all of the parts of the motion picture projector and a front cover section removably attachable to the rear cabinet section, removal of said front cover section permitting open cabinet remote screen projection, the said removable front cover section having embodied therein means to quickly and interchangeably permit projection onto a remote screen and projection onto a screen built into the said front cover section.

To the accomplishment of the foregoing objects and such other objects as may hereinafter appear, my invention is directed to the cabineted motion picture projector as more particularly hereinafter defined in the appended claims taken together with the following specification and the accompanying drawings, in which:

FIG. 5 is a view of the parts shown in FIG. 2 taken in section in the plane of the line 5—5 of FIG. 2;

FIG. 6 is a view of a detail taken in cross-section in the plane of the line 6—6 of FIG. 2; and FIG. 7 is a side elevational view, drawn to a reduced scale, with some parts broken away, of the cabinet projector.

Figure 1:
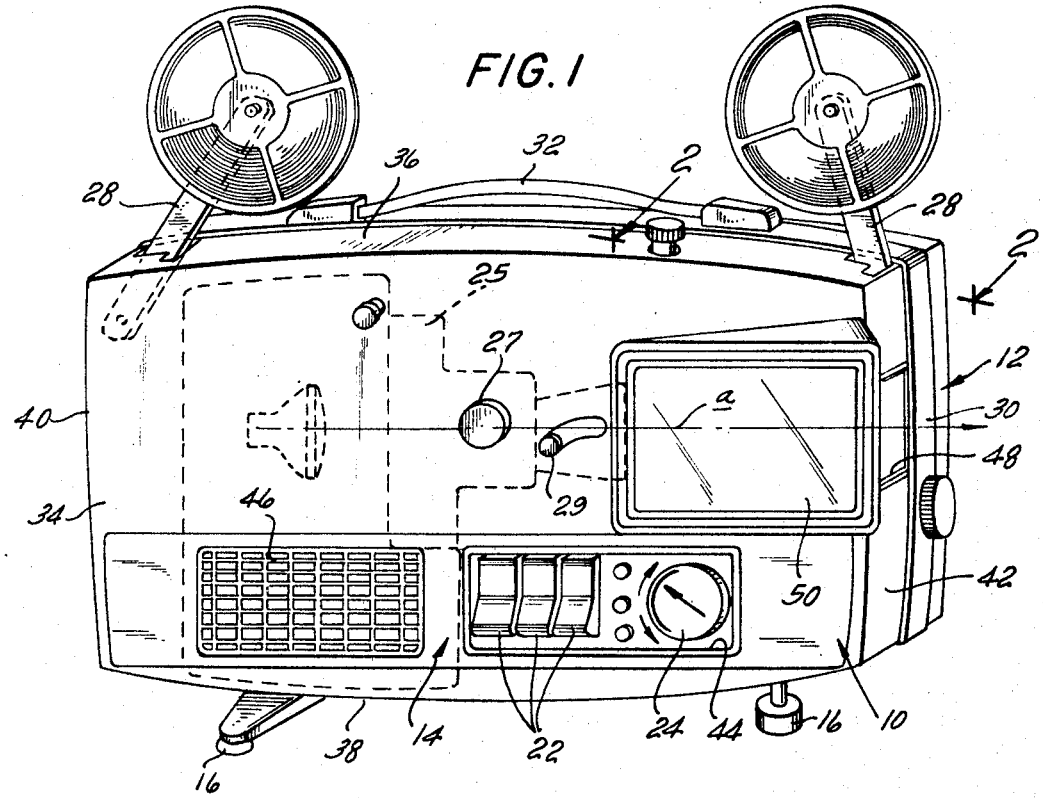
FIG. 1 is a perspective view of the cabineted motion picture projector of the invention showing the same in cabinet closed condition.

Referring now more in detail to the drawings and having reference first to FIGS. 1 and 7 thereof, the cabineted motion picture projector comprises a cabinet generally designated as 10 having a rear cabinet section generally designated as 12 and a front cover section generally designated as 14, the rear cabinet section forming a housing and support for all of the parts of the motion picture projector, and the front cover section being removably attachable to the rear cabinet section.

The rear cabinet section 12 supported by the pedestal legs 16, 16 encases in the enclosure 18 thereof (see FIG. 7) the operating parts (not shown) of the motion picture projector, is provided with a sub-casing 20 housing controlling parts, the switch buttons 22 and the speed control knob 24 of which extend forwardly and to the exterior of the projector cabinet as most clearly shown in FIG. 1 of the drawings. The rear cabinet section also supports a projection lens system 25 having its optical axis $a$ arranged athwart or longitudinally of the projector as best shown in FIG. 1 of the drawings. On the front wall 26 (see FIG. 7) of the rear cabinet enclosure 18 are pivoted the arms 28, 28 movable from an inactive position inside of the cabinet to the extended position shown in FIG. 1 for supporting both the supply and takeup motion picture reels of the projector. The rear cabinet section is provided medially with an encircling band 30, to the top of which is attached a transport handle 32. Other control elements such as a finger knob 27 and a rod 29 for varying the focusing position of the projection lens extend from the projection lens to the outside of the projector.

The front cover section 14 is a hollow unit defined by a front panel 34, top and bottom walls 36 and 38 and end walls 40 and 42, as best shown in FIGS. 1 and 7. The said hollow cover section is removably attachable by way of said top, bottom and end walls to the rear cabinet section by being slid into and out of the encircling band 30 of the rear cabinet section. The front panel 34 of said cover section is provided with an opening 44 for exposing the switch buttons 22 and the control knob 24. It is also provided with a reticulated screen 50. Removal of the front cover section 14 exposes the projector and the controls therefor, thereby permitting open cabinet remote screen motion picture projection.

Figure 3:
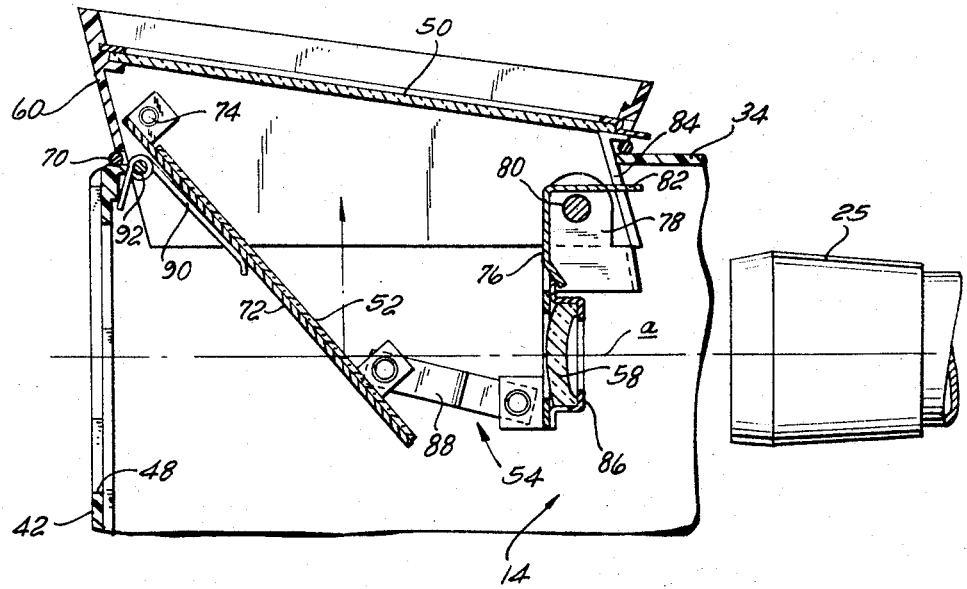
FIG. 3 is a top view of the parts shown in FIG. 2 taken in cross-section in the plane of the line 3—3 of FIG. 2 and showing the parts in position for a built-in screen projection.
Figure 4:
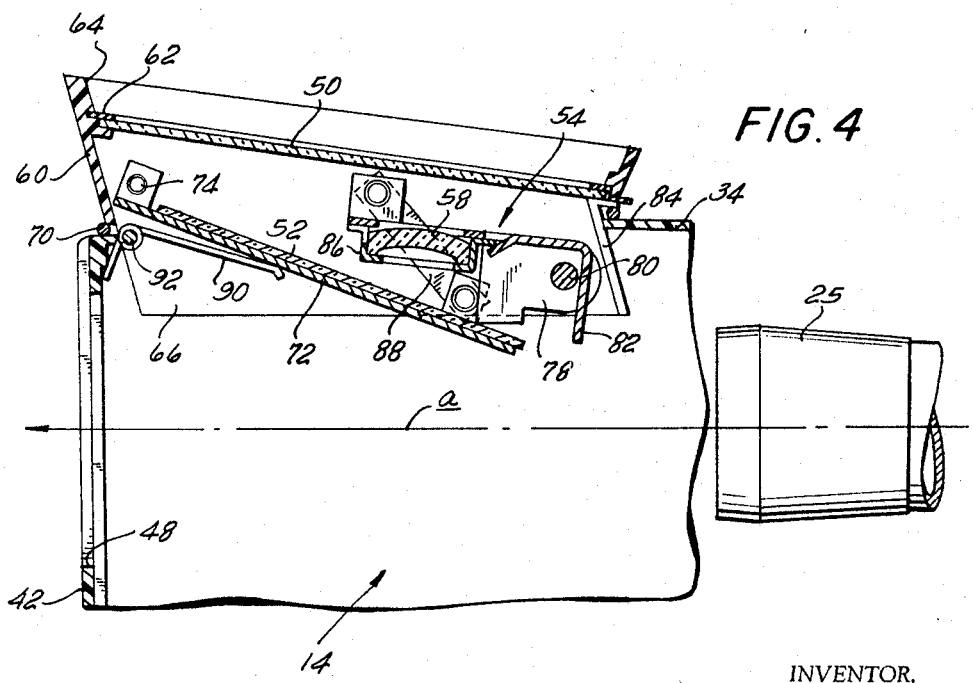
FIG. 4 is a view similar to that of FIG. 3 but showing the parts in position for a remote screen projection.

The cover section 14 is provided in its end wall 42 with an opening 48 arranged in and in a plane normal to the optical axis $a$ of the projection lens system 25 to permit of motion picture projection onto a remotely positioned screen through said opening when the cover section 14 is in closed condition, all as will be evident upon viewing FIGS. 1, 4 and 7 of the drawings The cover section 14 is provided further with means to permit built-in screen projection with the cabinet in its closed condition. Such means comprises a screen 50 exposedly mounted on the cover section at one end of the cover section, a reflector 52 pivotally mounted behind the screen on and within said cover section and movable between a position in the path of the optical axis $a$ as depicted in FIG. 3 of the drawings and a position out of and clearing the path of the optical axis as depicted in FIG. 4 of the drawings, and means generally designated as 54 mounted on and within said movable cover section 14 terminating in a manually operable knob 56 extending upwardly from said cover section, connected to said reflector for moving the same between said positions. As will be evident from the drawings, when the reflector is positioned in the path of the optical axis (FIG. 3), the projected picture is reflected onto the screen 50, and when the reflector is moved to a position clear of the path of the optical axis (FIG. 4), the picture is projected through the cover opening 14 to a remotely positioned screen.

Associated with the movable reflector 52 there is preferably provided a divergent lens 58 for enlarging the picture projected onto the built-in screen, the said lens 58 being also movable between a position in the path of the optical axis a as depicted in FIG. 3 of the drawings, and a position clearing the optical axis as depicted in FIG. 4 of the drawings, the means 54 for moving the mirror between its two positions being connected to embody the lens 58 for coordinatingly moving the lens with the movement of the mirror.

For mounting the projection screen 50 I provide a frame 60 into which the screen 50 is seated and held in position thereon by means of a bezel 62, the said frame having a front portion 64 serving as a hood for the screen and a rear portion 66 mounted on and extending into the front panel 34 of the cover section 14, the said rear portion being secured in position by means of spring clips 68, 68 attached to the top and bottom walls of said rear portion 66 (see FIGS. 2 and 5), one tine of which springs engage the interior wall of the front panel 34 as best seen in FIG. 5 of the drawings, the said frame 60 being further secured in position against the outside wall of said panel 34 by means of a retaining ring 70.

The reflector 52 is fixed to a backing 72 which is pivotally mounted at 74 on the top and bottom walls of said frame section 66. Also pivotally mounted on the top and bottom walls of said frame section 66 is a plate 76 formed with angled sections 78 keyed to a shaft 80 extending through the top wall 36 of the cover section to which the operating knob 56 is secured. The said plate 76 is also formed with an angled part 82 defining a stop means engaging parts 84 of the frame (see FIG. 5). The plate 76 carries the lens 58 held in a lens holder 86.

Figure 2:
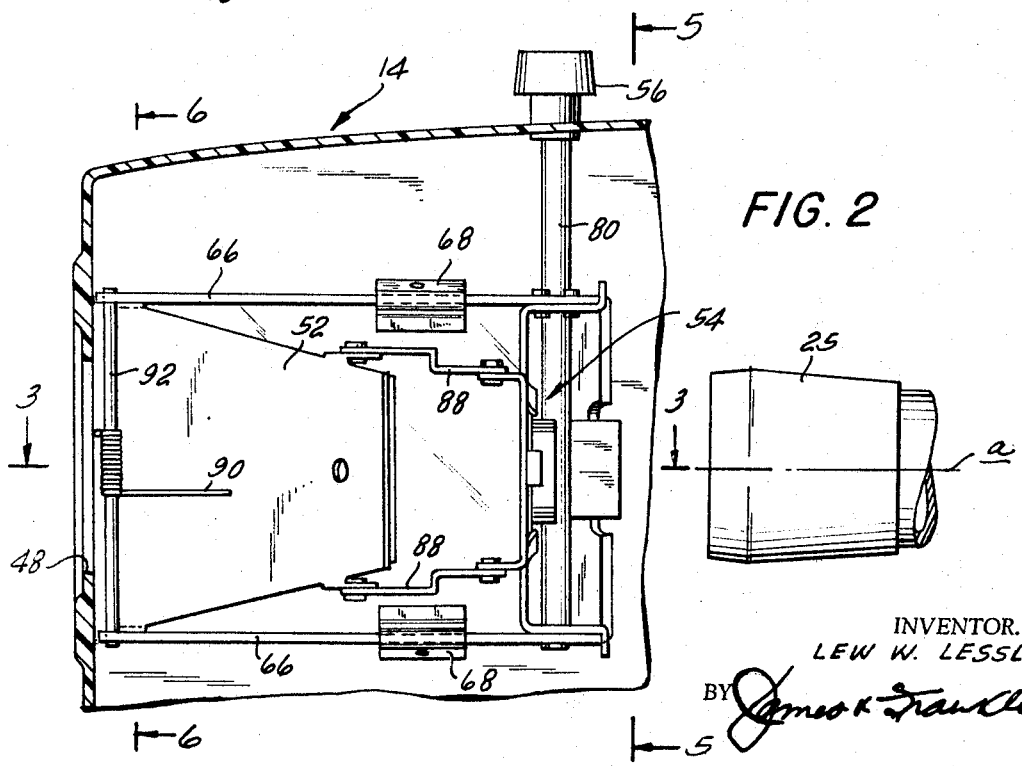
FIG. 2 is a rear elevational view shown on an enlarged scale of parts of the front cover section, taken in cross-section in the plane of the line 2—2 of FIG. 1.

The reflector backing 72 and the plate 76 are articulately linked together by means of the links 88 for the described coordinating movement of the mirror 52 and the lens 58. The linkage is so arranged that in the position shown in FIG. 3 the links have been moved beyond their dead center positions. For holding the mirror and lens combination in both of their described positions a loading spring 90 mounted on a rod 92 (anchored to the top and bottom walls of the frame section 66), one end of which spring is anchored against the wall 42 of the removable cover, engages the reflector backing 72 as best seen in FIGS. 2 to 4 of the drawings.

With this described construction it will be apparent that upon rotating the knob 56 in one direction, the operating means 54 will by a flipping action move the mirror 52 and lens 58 into the path of the optical axis a as depicted in FIG. 3 of the drawings, and by rotating the knob in the opposite direction the operating means 54 will by a flipping action move the mirror and the lens out of the path of the optical axis and to their collapsed condition as depicted in FIG. 4 of the drawings. The frame 60 is designed and mounted of the removable cover as best seen in FIGS. 3 and 4 of the drawings so as to provide adequate space for housing the mirror, lens and the operating means therefor in their collapsed condition.

The operation and use of the cabineted motion picture projector of the invention will, it is believed, be fully apparent from the above detailed description of its structure and functioning. With the cabinet 10 in its open condition, i.e. with the cover section 14 removed from the rear housing and support section 12, the projection lens system and the controls for the projector are exposed, thereby permitting open cabinet remote screen motion picture projection. With the cabinet in its closed condition as depicted in FIG. 1, the projector is adapted for either remote screen projection or built-in screen projection. For remote screen projection the knob 56 is rotated to move the reflector 52 and its associated lens 58 to their positions shown in FIG. 4 of the drawings, thereby permitting motion picture projection onto a remotely positioned screen through the opening 48 in the end wall 42 of the removable cover section. For built-in screen projection the knob 58 is rotated in the opposite direction for moving the reflector 52 and the lens 58 to their positions shown in FIGS. 3 and 5 of the drawings whereby the projected picture enlarged by the lens 58 will be reflected by the reflector 52 and projected onto the built-in screen 50.

It will be apparent that many changes may be made in the structure described without departing from the spirit of the invention defined in the following claims.

I claim:

1. A cabineted motion picture projector, comprising a cabinet having a rear cabinet section and a front cover section removably attachable to the rear cabinet section, the rear cabinet section forming a housing and support for the parts of the motion picture projector, said parts including a projection lens system having its optical axis arranged longitudinally of the cabinet, one of the end walls of said cabinet being formed with an opening arranged in said optical axis to permit of remote screen projection through said opening, and means to permit built-in screen projection comprising a screen exposedly mounted on said cover section, a reflector pivotally mounted behind said screen on and within said cover section and movable between positions into and out of the path of said optical axis and means mounted on and within said cover section terminating in a manually operable element extending from said cover section connected to said reflector for moving the same between said positions.

2. A cabineted motion picture projector for open cabinet remote screen projection and for closed cabinet projection with the latter adapted for either remote screen projection or built-in screen projection, comprising a cabinet having a rear cabinet section and a front cover section, the rear cabinet section forming a housing and support for the motion picture projector and its parts, said parts including a projection lens system having its optical axis arranged longitudinally of the cabinet, the front cover section being hollow, and, defined by a front panel, top and bottom and end walls, being removably attachable by way of said walls to the rear cabinet section, one of said end walls being formed with an opening arranged in said optical axis to permit of remote screen projection through said opening with the cover section closed, removal of said front cover section permitting open cabinet remote screen projection, and means to permit built-in screen projection with the cabinet closed comprising a screen exposedly mounted on said front panel, a reflector pivotally mounted behind said screen on and within said cover section and movable between positions into and out of the path of said optical axis and means mounted on and within said cover section terminating in a manually operable element extending from said cover section connected to said reflector for moving the same between said positions.

3. The cabineted motion picture projector of claim 1, in which an enlarging lens is associated with said reflector, is pivotally mounted on and within said cover section and is movable between positions into and out of the path of said optical axis, the means for moving the reflector being connected to said enlarging lens for coordinatingly moving the lens with the movement of the reflector.

4. The cabineted motion picture projector of claim 2, in which an enlarging lens is associated with said reflector, is pivotally mounted on and within said cover section and is movable between positions into and out of the path of said optical axis, linkage means connecting the reflector and the lens for coordinated movement, the means for moving the reflector being connected by said linkage means to said lens for moving the lens, and spring loading means associated with said reflector and lens active with said linkage means for holding the reflector and lens in both of their positions.

5. The cabineted motion picture projector of claim 1 in which controlling parts for the motion picture projector housed in the rear cabinet section include switch buttons and a speed control knob which extend forwardly to the outside of the projector through the removable front cover section.

6. The cabineted motion picture projector of claim 5 in which control elements for varying the focusing position of the projection lens extend forwardly to the outside of the projector through the removable front cover section.

References Cited

UNITED STATES PATENTS

| | | | |
|---|---|---|---|
| 1,721,425 | 7/1929 | Winzenburg | 352—136 |
| 2,032,116 | 2/1936 | Conrad | 352—104 |
| 2,439,987 | 4/1948 | Roger | 88—24 |
| 3,159,841 | 12/1964 | Castedello et al. | 352—136 X |

NORTON ANSHER, *Primary Examiner.*

M. H. HAYES, *Assistant Examiner.*